UNITED STATES PATENT OFFICE.

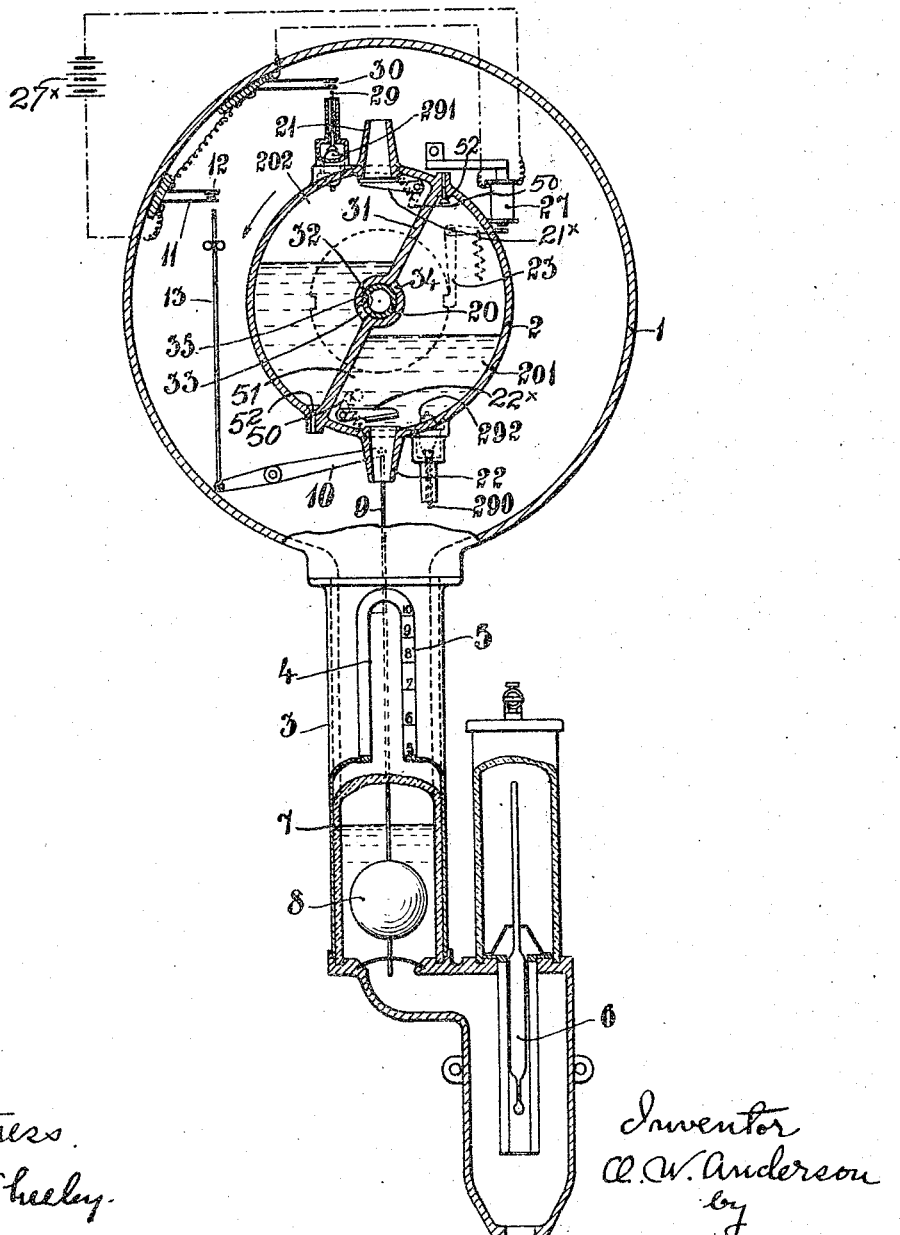

OSCAR W. ANDERSON, OF RÅSUNDA, SWEDEN.

FLUID-MEASURING APPARATUS.

1,201,229.  Specification of Letters Patent.  Patented Oct. 17, 1916.

Application filed March 17, 1915. Serial No. 15,110.

*To all whom it may concern:*

Be it known that I, OSCAR W. ANDERSON, a citizen of the Kingdom of Sweden, residing at Råsunda, Sweden, have invented new and useful Improvements in Fluid-Measuring Apparatus, of which the following is a specification.

This invention relates to apparatus for measuring fluids including a rotary measuring vessel divided into a number of compartments and provided with an electromagnetically or mechanically operated locking device.

The object of the invention is to provide an improved apparatus of this kind which may be used as a consumption controlling apparatus and in which the measuring operations are automatically controlled by the measured fluid itself.

A further object of the invention is to provide an apparatus of the said kind constructed and arranged to measure not only the units of volumes of the fluid consumed but also parts of such units.

The apparatus is especially adapted for measuring motor oil or lubricating oil to be used in connection with internal combustion engines and the like, for measuring the water quantities supplied to steam boilers, and for other purposes.

The invention consists, chiefly, in this that with the rotary measuring vessel is combined a receptacle adapted to receive the quantities of fluid measured off by the apparatus, and containing a float which directly or indirectly releases the locking device of the measuring vessel when the surface of the fluid in the receptacle has sunken to a certain level.

In the accompanying drawing, forming a part of this specification, a construction form of the invention is shown partly in section and partly in elevation.

Referring to this drawing, 1 designates a casing in which the measuring apparatus proper is arranged. The essential part of said apparatus consists of a vessel 2, divided into two compartments 201 and 202 by means of a partition 31. In the center of the vessel 2 said partition is enlarged to a cylindrical hub 32, by means of which the vessel is rotatably mounted on a hollow shaft 20, forming a common fluid supply for the two compartments of the vessel 2. Inlet openings 33 and 34 are provided in the hub 32 and an opening 35 is provided in the hollow shaft, the latter being arranged in such position that it registers with either of the openings 33 and 34 in the locked positions of the vessel 2. Each compartment is provided with a separate outlet 21, 22 respectively in the wall of the vessel 2, the arrangement being such that the one compartment communicates with the hollow shaft 20 when the outlet of the other compartment is open, as is shown in the drawing. A pivoted valve 21$^\times$ is employed in the vessel 2 to control the outlet 21, and a similar valve 22$^\times$ is employed complementary to the outlet 22. Each of said valves is closed and normally kept closed by a spring, as shown, and each is provided with an arm 50 (see dotted lines), arranged outside the vessel 2. As each of the valves approaches its lowermost position its arm engages a stationary projection 51, arranged in the casing 1, with the result that the valve is opened. The vessel 2 is also equipped with the ordinary air vent valves 52. In such position the vessel 2 is maintained by a locking device 23, controlled by an electromagnet 27. The movement of the vessel 2 from such a position to the following, after the one compartment has been filled and the other has been emptied, will be effected by the weight of the fluid in the first mentioned compartment, as soon as the locking device is operated to release the vessel 2. The construction of said measuring apparatus *per se* is well known.

Attached to the casing 1 below the measuring apparatus 2 is a preferably tubular receptacle 3, in which is tightly inserted a glass cylinder 7. The receptacle 3 is provided with a window 4 and on one side thereof with a scale 5. With the receptacle 3 is connected a hydrometer 6 to determine the specific gravity of the fluid, in case it is desired to know the weight of the fluid measured.

The receptacle 3 contains a float 8 connected by a rod 9 and a lever 10 to a rod 13 adapted to control two contact springs 11, 12. Said springs are included in the circuit of the electromagnet 27 and source of electric energy 27$^\times$. This circuit also includes contact springs 30 designed to be alternately controlled by pins 29 and 290, one complementary to each compartment, and connected with floats 291, 292, respectively. Consequently one spring 30 will be pressed against the other to close the circuit when the uppermost compartment is filled with fluid. Said circuit will, thus, only be closed when both the contacts 11, 12 and the contacts 30 are closed.

The contacts 11, 12 are closed when the surface of the fluid in the receptacle 3 has sunken to a certain level (zero position). The apparatus 2 will thus be maintained in locked position until the above said two conditions are fulfilled.

The apparatus 2 may be combined with an apparatus to count or register the number of measurements so that by referring to said apparatus a person in authority is enabled to ascertain the quantity of fluid passing through the apparatus. By observing the position of the fluid level in the receptacle 3, and subtracting the quantity of fluid in said receptacle from the quantity passed through the apparatus 2 it is possible, whenever desired, to obtain an exact value of the quantity of fluid consumed. By means of the hydrometer 6 connected to the receptacle 3 the specific gravity of the fluid may be determined.

Having now described my invention, what I claim as new and desire to secure by Letters Patent is:—

1. An apparatus for measuring fluids, comprising a rotary measuring vessel divided into compartments, electro-mechanical means for locking said vessel, a receptacle adapted to receive the fluid measured by said vessel, a float arranged in said receptacle, and means actuable by said float for controlling said electro-mechanical means and thereby unlocking the vessel.

2. An apparatus for measuring fluids, comprising a rotary measuring vessel divided into compartments, electro-mechanical means for locking said vessel, floats arranged in said compartments of the vessel, and means actuable by said floats, alternately, for controlling said electro-mechanical means and thereby unlocking the vessel.

3. An apparatus for measuring liquids, comprising a rotary measuring vessel divided into compartments, electro-mechanical means for locking said vessel, a receptacle adapted to receive the fluid measured by said vessel, floats arranged in the compartments of the vessel, a float arranged in said receptacle, means actuable by the floats in the compartments, alternately, for controlling the electro-mechanical means, and means actuable by the float in the receptacle for controlling the electro-mechanical means to unlock the vessel.

4. An apparatus for measuring fluids, comprising a rotary measuring vessel divided into compartments, electrically-operated means for locking said vessel, a receptacle constructed and arranged to receive fluid from said vessel, a source of electric energy, an electric circuit containing the electrically-operated means and said source of electric energy, a float arranged in said receptacle, and means actuable by the float for controlling the circuit to release the vessel from said electrically-operated means.

5. An apparatus for measuring fluids comprising a rotary measuring vessel divided into compartments, electrically-operated means for locking said vessel, a source of electric energy, an electric circuit containing the electrically-operated means and said source of energy, floats arranged in the compartments of the vessel, and means actuable by said floats, alternately, for controlling the circuit to release the vessel from said electrically-operated means.

In testimony that I claim the foregoing as my invention, I have signed my name in presence of two subscribing witnesses.

OSCAR W. ANDERSON.

Witnesses:
JOHN DETMAR,
GERHARD NORDSTRAND.

Copies of this patent may be obtained for five cents each, by addressing the "Commissioner of Patents, Washington, D. C."